(12) United States Patent
Naskali et al.

(10) Patent No.: US 8,908,350 B2
(45) Date of Patent: Dec. 9, 2014

(54) CAPACITOR

(75) Inventors: Matti Naskali, Tokyo (JP); Samuli Wallius, Turku (FI); Lassi Yla-Soininmaki, Turku (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 1162 days.

(21) Appl. No.: 12/215,261

(22) Filed: Jun. 25, 2008

(65) Prior Publication Data

US 2009/0323251 A1 Dec. 31, 2009

(51) Int. Cl.
*H01G 4/232* (2006.01)
*H01G 4/40* (2006.01)
*H01F 17/02* (2006.01)

(52) U.S. Cl.
CPC ............... *H01G 4/232* (2013.01); *H01G 4/40* (2013.01); *H01F 17/02* (2013.01)
USPC .......... 361/270; 361/271; 361/272; 361/275.1

(58) Field of Classification Search
USPC ................. 361/270, 271, 272, 275.1
See application file for complete search history.

(56) References Cited

U.S. PATENT DOCUMENTS

| | | | | |
|---|---|---|---|---|
| 1,460,390 A | | 7/1923 | O'Leary | |
| 2,521,513 A | | 9/1950 | Gray | 315/243 |
| 2,840,694 A | * | 6/1958 | Morgan | 455/95 |
| 3,025,431 A | * | 3/1962 | Reimers | 315/241 P |
| 3,671,885 A | * | 6/1972 | Pennypacker | 333/131 |
| 3,691,435 A | * | 9/1972 | Winn | 361/330 |
| 3,775,720 A | * | 11/1973 | Winn | 336/69 |
| 3,782,258 A | * | 1/1974 | Boekkooi et al. | 396/182 |
| 3,870,392 A | * | 3/1975 | Bond | 439/92 |
| 4,320,364 A | | 3/1982 | Sakamoto et al. | 333/167 |
| 4,368,407 A | * | 1/1983 | Wroblewski | 315/291 |
| 5,040,094 A | | 8/1991 | Okumura | 361/330 |
| 5,103,147 A | * | 4/1992 | Samann | 318/139 |
| 5,153,812 A | | 10/1992 | Naito | 361/270 |
| 5,337,028 A | | 8/1994 | White | 333/181 |
| 5,367,275 A | * | 11/1994 | Esaki et al. | 333/184 |
| 5,515,126 A | * | 5/1996 | Baxter et al. | 396/177 |
| 5,522,851 A | * | 6/1996 | Fayram | 607/5 |
| 5,892,668 A | * | 4/1999 | Okamoto et al. | 363/40 |
| 5,920,292 A | * | 7/1999 | O'Neill, Jr. | 343/895 |
| 6,204,817 B1 | * | 3/2001 | Edvardsson | 343/702 |
| 6,255,935 B1 | * | 7/2001 | Lehmann et al. | 307/3 |
| 6,529,363 B2 | * | 3/2003 | Waffenschmidt et al. | 361/270 |
| 6,661,644 B2 | * | 12/2003 | Shimada et al. | 361/508 |
| 6,836,401 B2 | * | 12/2004 | Yoshida et al. | 361/538 |
| 7,385,804 B2 | * | 6/2008 | Kuriyama | 361/532 |
| 2007/0086146 A1 | * | 4/2007 | Timmerman et al. | 361/434 |

FOREIGN PATENT DOCUMENTS

GB 1315878 A 5/1973

OTHER PUBLICATIONS

Perkinelmer Optoelectronics, High Performance Flash and Arc Lamps. Brochure (online). Created on Oct. 9, 2009, modified Sep. 25, 2006.

* cited by examiner

*Primary Examiner* — Zeev V Kitov
(74) *Attorney, Agent, or Firm* — Winstead PC

(57) ABSTRACT

A device including a first electrical conductor, a second electrical conductor, dielectric material connecting the first and second conductors to each other, and an output or ground terminal section. The first electrical conductor has a first terminal section and a first plate section. The second electrical conductor includes a second terminal section and a second plate section. The second terminal section is connected to a first end of the second plate section. The second plate section includes a coil shaped section. The output terminal section is connected to an opposite second end of the second plate section. The dielectric material connects the first and second plate sections to each other.

18 Claims, 11 Drawing Sheets

CAPACITOR

BACKGROUND OF THE INVENTION

1. Field of the Invention

The invention relates to an electrical device and method and, more particularly, to capacitance and inductance.

2. Brief Description of Prior Developments

A capacitor can be used for a power supply for an apparatus, such as a Switch Mode Power Supply (SMPS) or a xenon flash for a camera for example.

In a switch mode power supply (SMPS), energy flow is controlled with power semiconductors that are continuously switching ON and OFF with high frequency. The "switchers" offer greater efficiency compared with linear supplies because an ideal switch does not dissipate power. They also have smaller size and lighter weight due to reduced passive components size and lower heat generation.

Switch mode operation contributes to lower power losses—when a switch is "off" the current through it is near zero, when it is "on" the voltage across it is low. However, it introduces additional electrical noise (EMI) whose acceptable limits vary with the frequency. The switcher's frequency is normally selected based on size, efficiency, cost and EMI considerations.

To reduce noise of SMPS an input noise reduction filter is used in addition to a SMPS input capacitor. This is achieved by adding another capacitor and a resistor or inductance between the two capacitors. The additional capacitor can also work as an input capacitor, but the resistor or inductance has no other use other than filtering the noise.

In a capacitor a serial inductance has an harmful impact. That is why the terminals are design so that the inductance is minimized. The serial inductance and serial resistance, ESR, is considered a negative characteristic of a capacitor.

A three-terminal capacitor consists of two active electrodes surrounded by a third, or shield, conductor. The direct capacitance between the two active electrodes is the capacitance of interest, and, when shielded leads are used, it is independent of the location of all other conductors except the shield.

A common construction of capacitors is use of windings as plates. A winding roll tends to have inductance, and in order to reduce the inductance the terminals are connected in the center of the electrodes, so the current flowing into and from the ends of the electrodes compensate their magnetic fields; thus reducing the inductance.

SUMMARY

The following summary is merely intended to be exemplary. The summary is not intended to limit the scope of the claimed invention.

In accordance with one aspect of the invention, an apparatus is provided comprising an electrical component having a plurality of electrical conductors; and a flash connected to the conductors. The flash comprises a flash lamp and an electrical device. The electrical device comprises a capacitor and an inductor with a common electrical conductor having a winding roll shaped section which forms a winding plate of the capacitor and a coil of the inductor.

In accordance with another aspect of the invention, an apparatus is provided comprising a switch mode power supply; and an electrical device connected to an input of the switch mode power supply. The electrical device comprises a capacitor and an inductor with a common electrical conductor having a winding roll shaped section which forms a winding plate of the capacitor and a coil of the inductor.

In accordance with another aspect of the invention, a device is provided including a first electrical conductor, a second electrical conductor, dielectric material connecting the first and second conductors to each other, and an output or ground terminal section. The first electrical conductor has a first terminal section and a first plate section. The second electrical conductor includes a second terminal section and a second plate section. The second terminal section is connected to a first end of the second plate section. The second plate section includes a coil shaped section. The output terminal section is connected to an opposite second end of the second plate section. The dielectric material connects the first and second plate sections to each other.

In accordance with another aspect of the invention, a device is provided comprising a capacitor and an output terminal. The capacitor comprises a first coil shaped plate connected to a first terminal, a second coil shaped plate connected to a second terminal, and dielectric material connecting the first and second plates to each other in a spaced inter-rolled fashion. The output terminal is connected to the second plate at a location spaced from the second terminal. The second terminal, the second plate and the output terminal form an inductor such that the second coil shaped plate is a common member of both the capacitor and the inductor.

In accordance with another aspect of the invention, a device is provided comprising a capacitor comprising an first terminal and a winding roll plate connected to the first terminal; and an inductor comprising an input, an output and the winding roll plate. The input comprises the first terminal of the capacitor, and the output comprises an output terminal extending from the winding roll plate proximate an opposite end of the plate relative to the first terminal.

In accordance with another aspect of the invention, a method is provided comprising providing an electrical apparatus subassembly; and connecting a device to the an electrical apparatus subassembly. The device comprises a capacitor and an inductor having a common member forming a winding roll plate of the capacitor and a coil of the inductor. The common member is configured to provide inductance to reduce noise of the an electrical apparatus subassembly.

In accordance with another aspect of the invention, a method is provided comprising turning ON current to an apparatus from a combined capacitor and inductor device, wherein a capacitor and an inductor of the device comprise a common member forming a winding roll plate of the capacitor and a coil of the inductor; and turning OFF the current from the capacitor to the apparatus, wherein a slope of the current from ON to OFF is increased by inductance from the combined capacitor and inductor device to delay a current turn off point of the current from the capacitor.

BRIEF DESCRIPTION OF THE DRAWINGS

The foregoing aspects and other features of the invention are explained in the following description, taken in connection with the accompanying drawings, wherein.

DETAILED DESCRIPTION OF EMBODIMENTS

Figure 1:
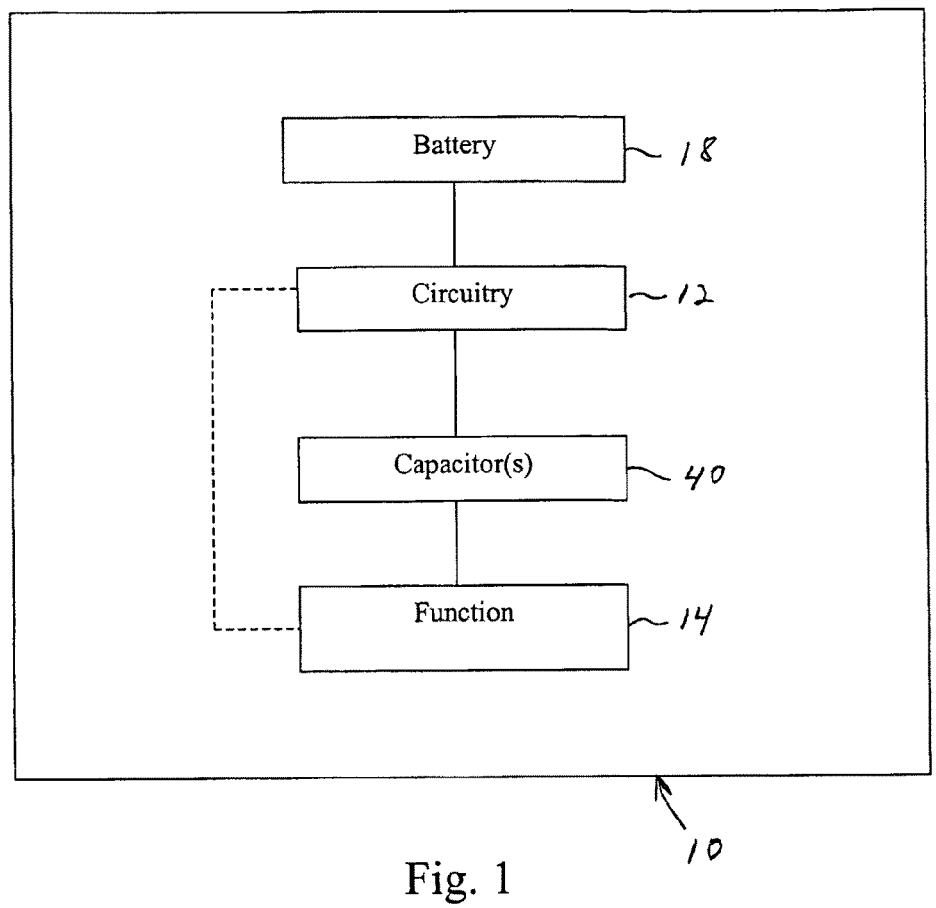
FIG. 1 is a block diagram of an apparatus comprising features of the invention.

Referring to FIG. 1, there is shown a diagram of a device 10 incorporating features of the invention shown. Although the invention will be described with reference to the embodiments shown in the drawings, it should be understood that the invention can be embodied in many alternate forms of embodiments. In addition, any suitable size, shape or type of elements or materials could be used.

In one embodiment, the device 10 is an imaging device, such as a digital camera. Alternatively, the device 10 could be any suitable type of device having a capacitor as further understood from the description below. For example, in one embodiment the device 10 is a mobile telephone handset having a digital camera feature. The device 10 generally comprises a battery 18, circuitry 12, one or more capacitors 40, and a function 14. For the imaging device 10 in this embodiment, the function 14 comprises suitable hardware and perhaps software for taking a digital photograph. However, any suitable function which uses a capacitor could be provided.

Figure 2:
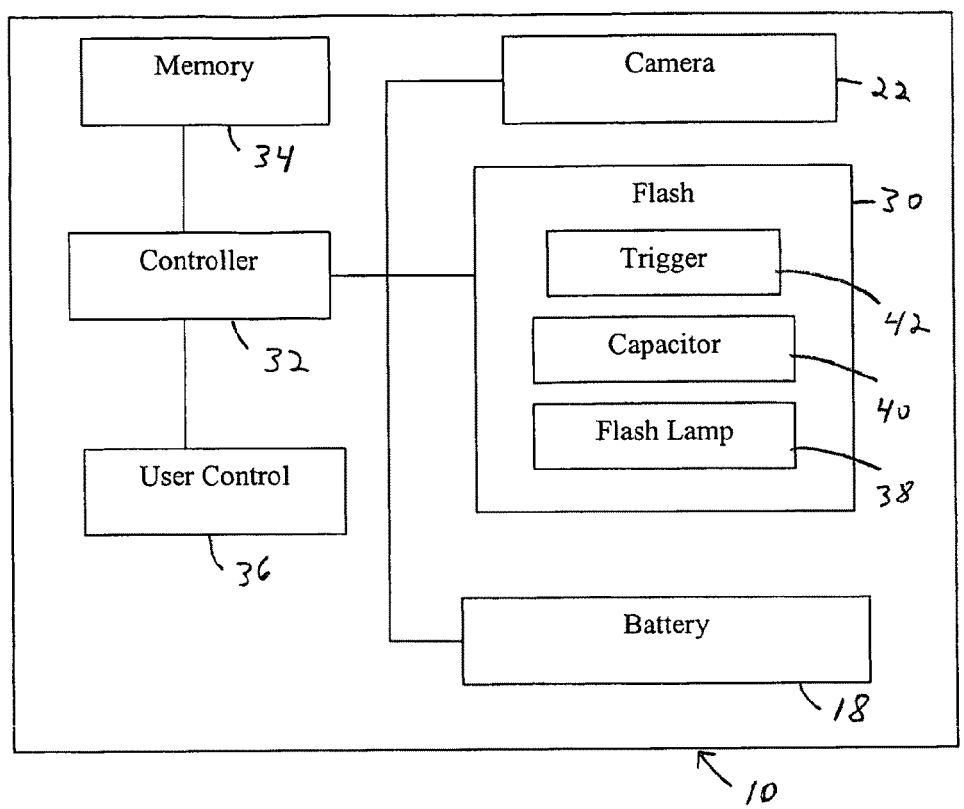
FIG. 2 is a block diagram showing some of the components of the apparatus shown in FIG. 1.

Referring also to FIG. 2, the function 14 can include a controller 32 and a memory 34. The device 10 can comprise a user control 36, such as a keypad or a touch screen for example, which is connected to the controller 32. In this embodiment the function 14 includes a camera 22 and a flash 30. The camera 22, flash 30 and battery 18 are connected to the controller 32. The controller 32 is configured, such as with software programming, to take a digital picture with the camera 22 and store the digital information in the memory 34. The controller 32 can also control actuation of the flash 30. In one type of embodiment, actuation of the flash 30 might be automatic when the camera 22 is used.

Figure 3:
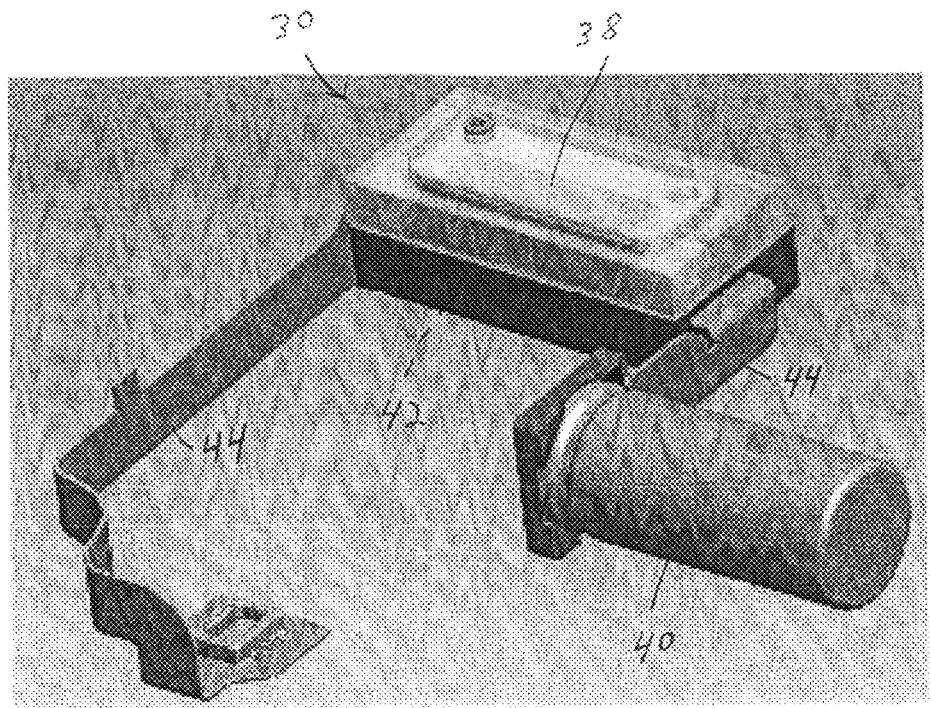
FIG. 3 is a perspective view of a subassembly used in the apparatus shown in FIGS. 1 and 2.

Referring also to FIG. 3, the flash 30 comprises a flash lamp 38, the capacitor(s) 40 and a trigger 42. The flash lamp 38 is a xenon flash lamp. However, any suitable flash lamp could be provided. In this embodiment, the circuitry 12 includes a flex cable 44 which electrically connects the capacitor 40 to the battery 18, electrically connects the capacitor 40 to the flash lamp 38, and electrically connects the trigger 42 to the controller 32, the capacitor 40 and the flash lamp 38. In alternate embodiments any suitable connection among the components could be provided.

Figure 4:
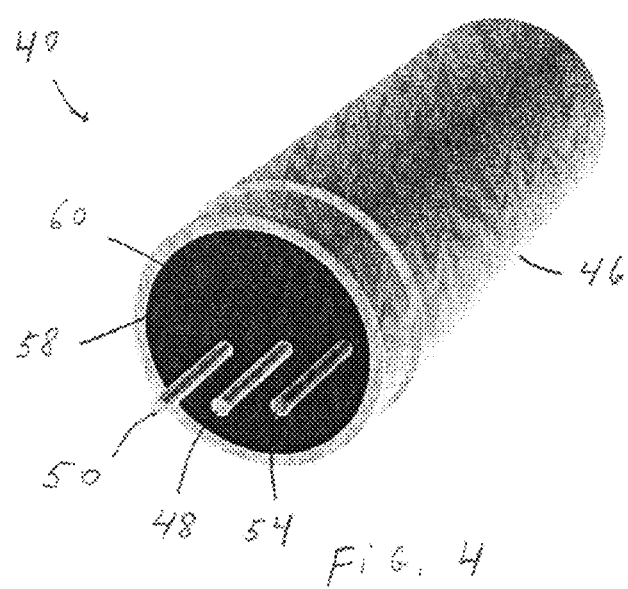
FIG. 4 is a perspective view of the capacitor/inductor device in FIG. 3.
Figure 5:
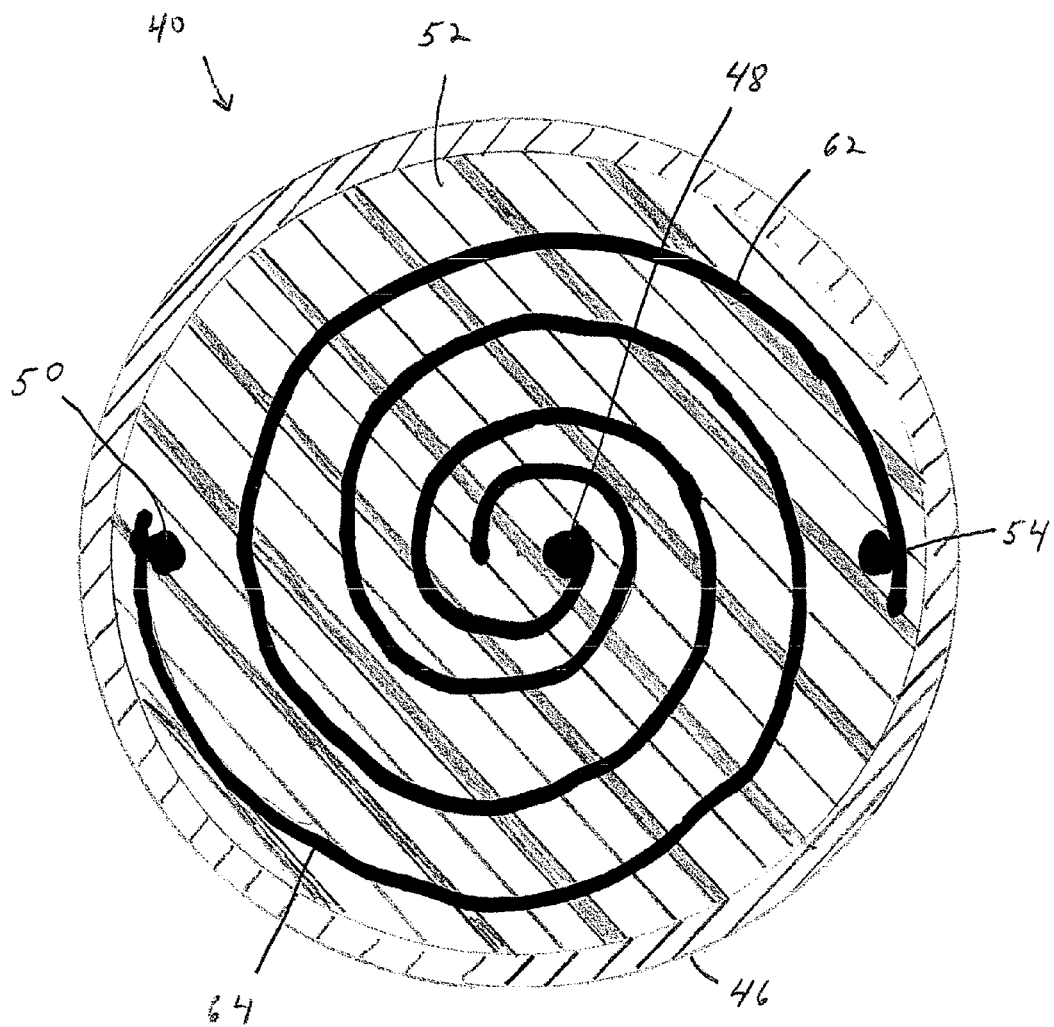
FIG. 5 is a cross sectional view of the device shown in FIG. 4.
Figure 6:
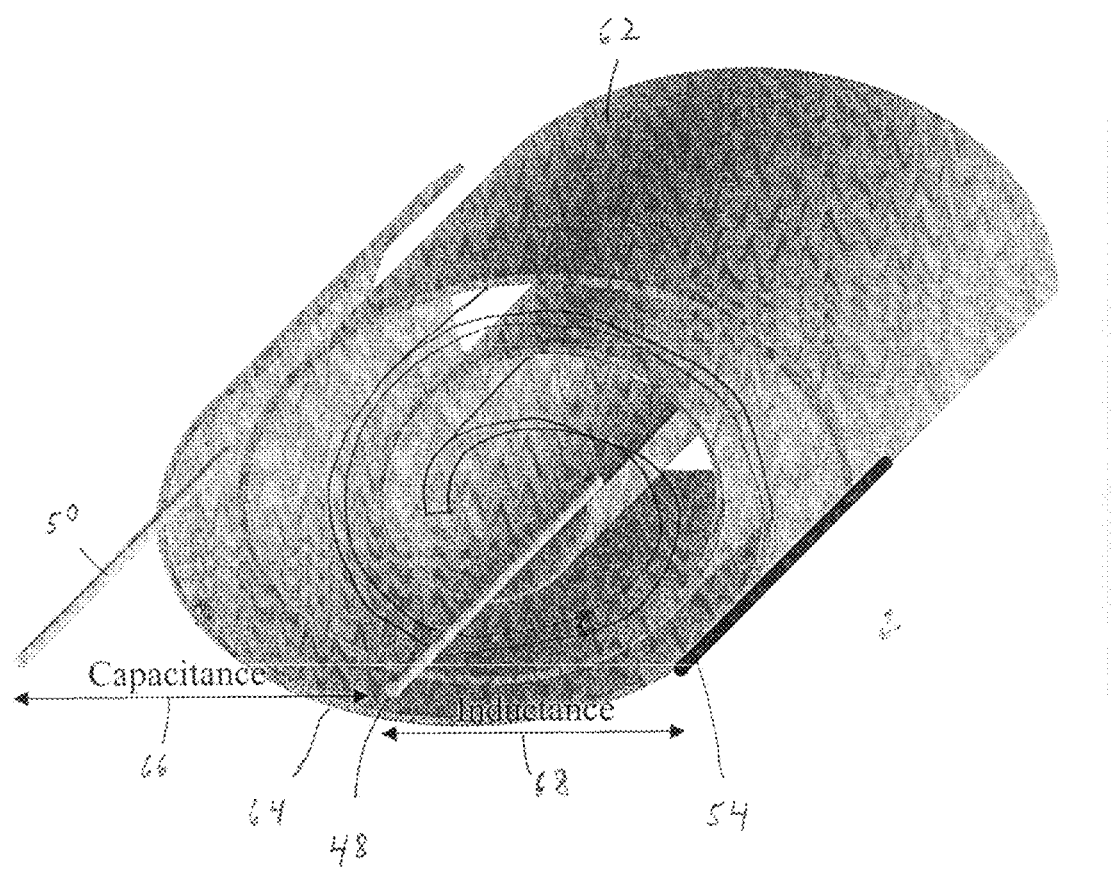
FIG. 6 is a perspective view of some of the components of the device shown in FIG. 5.

Referring also to FIGS. 4-6, the capacitor 40 generally comprises a body or housing 46, a first anode terminal 48, a second cathode terminal 50, dielectric material 52, and a third output or ground terminal 54. It should be noted that in some regions, use of "anode" and "cathode" are reversed. For example, in Japan "anode" might be considered a "cathode", and visa versa. In the embodiment shown in FIGS. 4-6, the first terminal 48 is a positive/input terminal, the second terminal 50 is a negative terminal, and the third terminal 54 is a positive/output terminal (or ground terminal). FIG. 6 shows the capacitor without showing the housing and the dielectric material. The capacitor 40 can be connected to the flex cable 44 with the first terminal 48, second terminal 50 and the third terminal 54 being electrically, directly connected to conductors of the cable, such as by solder. The housing 46 is comprised of electrically conductive metal, such as in the form of a can. The housing 46 has an aperture 58 into the housing. A seal or closure 60 is provide at the aperture 58. The three terminals 48, 50, 54 extend through the closure at a first end side of the capacitor.

The capacitor 40 also includes two plates 62, 64. The first plate 62 is connected to the first terminal 48 to form a first electrical conductor for the capacitor. The second plate 64 is connected to the second terminal 50 to form a second electrical conductor for the capacitor. In this embodiment, the two plates 62, 64 are provided with a general coil shape or winding roll shape. In this embodiment the two plates 62, 64 are inter-rolled with each other with the dielectric material 52 therebetween. As seen by arrow 66 in FIG. 6, capacitance can be provided between the first and second terminals 48, 50.

First terminal 48 is connected to a first end of the first plate 62. The third terminal 54 is connected to a second opposite end of the first plate 62. Because of the coiled shape of the first plate 62, this can provide an inductor with inductance between the first and third electrodes 48, 54 as indicated by arrow 68 in FIG. 6. Thus, the device 10 can function as both a capacitor and a coil inductor.

In camera flash generation, the timing of especially short flashes in close imaging are very important and difficult to arrange. Adding inductance can make the timing more accurate. Adding inductance to the circuitry can also impact the flash color temperature; moving it to a better area. However, for hand held devices such as a digital camera or camera in a telephone handset, an inductor having suitably large inductance that can handle the huge current of a camera flash cannot have ferrite core because the size of the inductor would be too big for modern designs.

Figure 7:
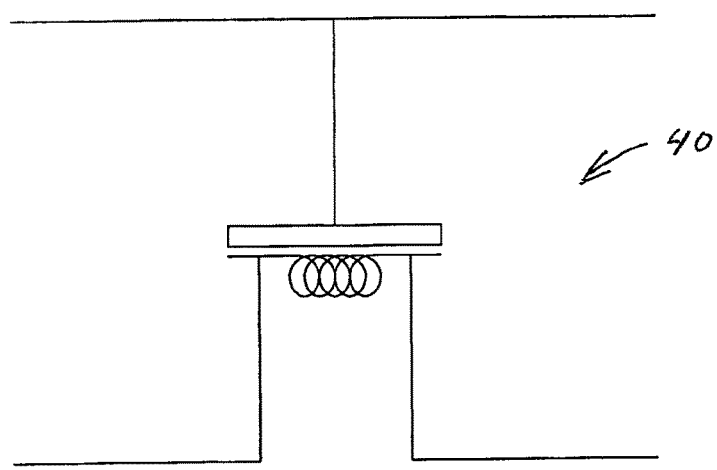
FIG. 7 is a circuit diagram of the device shown in FIGS. 4-6.

The invention can add one or more terminals to a capacitor so that the natural inductance of the capacitor, beneficially a roll, impacts between the input and output rather than between the capacitor itself and the terminal (where it would otherwise have a harmful impact in some cases). Furthermore, with the invention the output terminal 54 can be used for grounding the capacitor. This can add extra noise reduction and electric radiation immunity. A circuit diagram illustrating the new combined capacitor and inductor device 40 is shown in FIG. 7. As can be seen, the inductor is one of the plates of the capacitor. Thus, the inductor is not arranged in series with the capacitor. The parallel capacitor-inductor arrangement is intertwined or intermixed, and are not spaced from each other.

The invention can comprise a three to four legged capacitor (for example electrolytic or ceramic). Two of the contact points or terminals are placed proximate opposite ends of a first one of the capacitor plates, and the other capacitor plate can have either one or two terminals. The invention can comprise the concept of having an inductance component in a capacitor body; the construction of a such capacitor; the method of utilizing such a capacitor in both separating power networks (Radio Frequency, for example) and using it in controlling the timing of turn-off point and noise.

Figure 8:
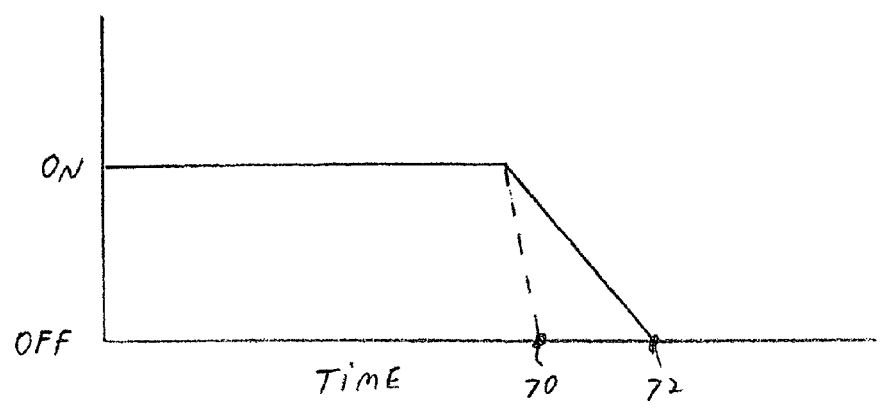
FIG. 8 is a diagram showing the increased duration from ON to OFF of the device shown in FIGS. 4-7.

In a xenon flash, it is important to control the turn-on point and turn-off point of the current. Referring also to FIG. 8, in the past, with a short light pulse the turn-off point 70 is on the area where stray inductance makes it difficult to tune the amount of light. It would be good to have magnitudes smaller inductance so the current could settle before turning OFF. Because so much has been done to compensate for the stray inductances in the past, there is nothing much one can due, but live with level of stray inductances. However, remarkable higher inductance would be good so that the current is clearly ON with an increasing slope towards the turn-off point.

With a dominating inductance inside the capacitor, the timing of the turn-off point can be changed to a far later turn-off point 72 in time than the turn-off point 70 of a conventional capacitor, and this can gain much more accuracy in the system. Under normal understanding, adding an inductance into a circuit would not have seemed practical; because there is no space for such a component. However, it was discovered that using the roll of a capacitor plate for the inductor coil was possible.

Figure 9:
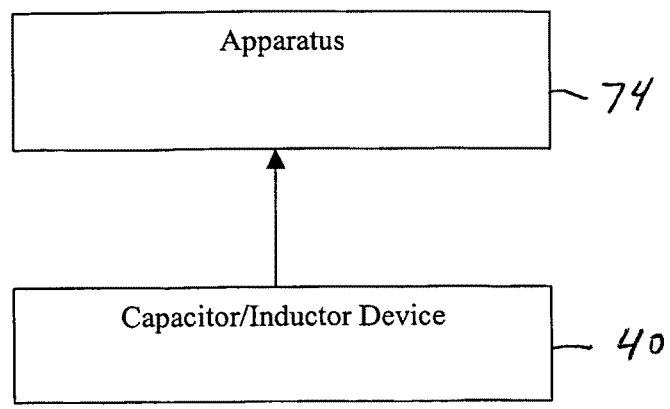
FIG. 9 is a block diagram illustrating use of the capacitor/inductor device with another apparatus, such as a switch mode power supply (SMPS) for example.

Also in SPMS the inductance of the capacitor would reduce noise. Referring also to FIG. 9, the invention can comprise use of one or more of the capacitors 40 as an input or output to an apparatus 74 (or part of an apparatus) such as when the apparatus 74 is a SPMS for example. So, there are at least two applications benefiting of the roll inductance of a capacitor.

Advantages of the invention can include:
Additional inductance and resistance between an input and an output can reduce noise in a Switch Mode Power Supply.
Currently, a discrete resistor or inductance and a second capacitor are used for noise reduction in a Switch Mode Power Supply. These two components can be eliminated. This can provided a noticeable cost reduction.
A Second ground or output terminal can enable a separate ground pin configuration.
In a xenon flash grounding is needed. Currently the grounding is made by gluing the can (housing) to a ground. By eliminating this type of manufacturing step, there can be a remarkable cost reduction.
Additional inductance benefits a xenon flash by improving the accuracy of short flash pulses.
Additional inductance benefits a xenon flash by changing the color temperature to more beneficial area.

The invention can be used for a power capacitor construction that is used, for example, in a Switch Mode Power Supply (SMPS) or a xenon flash for a camera.

Figure 10:
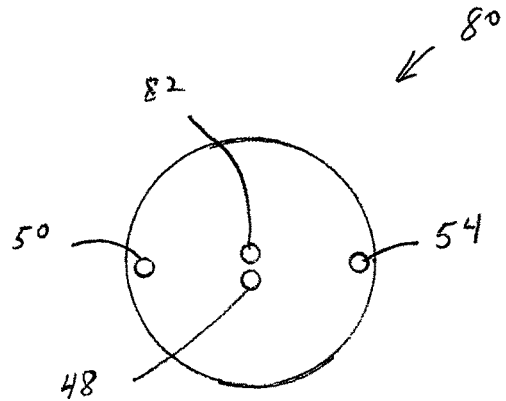
FIG. 10 is an end view of an alternate embodiment of the invention.
Figure 11:
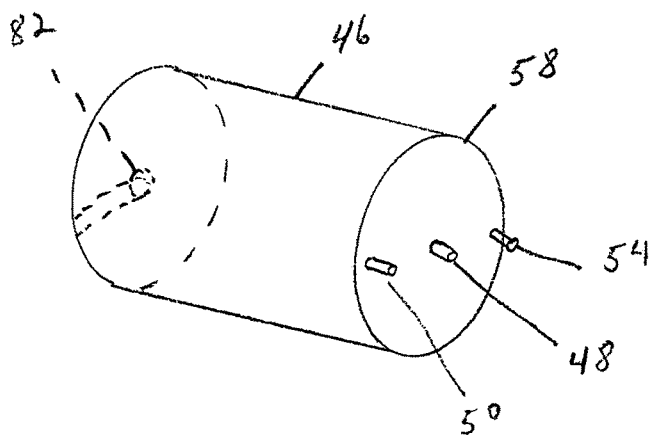
FIG. 11 is a perspective view of another alternate embodiment of the invention.

As noted above, a second ground or output terminal (in other words a fourth terminal) can enable a separate ground pin configuration. One example of this is shown in FIG. 10. The device 80 comprises the first, second and third terminals 48, 50, 54, and a fourth terminal 82. The fourth terminal 82 is a ground or output terminal connected to an end of the second plate 64 at the opposite end of the plate from the second terminal 50. FIG. 11 shows another embodiment where the fourth terminal 82 is connected to the housing 46 at the opposite end of the housing from the aperture 58.

In accordance with one aspect of the invention, an apparatus is provided comprising an electrical component and a flash. The electrical component includes a plurality of electrical conductors. For example, the electrical component could be a printed circuit board or the flex cable 44. The flash is connected to the conductors, The flash comprises a flash lamp 38 and an electrical device 40. The electrical device 40 comprises a capacitor and an inductor with a common electrical conductor having a winding roll shaped section 62 which forms a winding plate of the capacitor and a coil of the inductor. The electrical component could be any suitable electrical component having electrical conductors. The apparatus could be the subassembly shown in FIG. 3, or the apparatus 10 shown in FIG. 1, for example. The electrical device could be directly connected to the conductors of the flash lamp.

In accordance with another aspect of the invention, an apparatus is provided including a first electrical conductor (48, 62), a second electrical conductor (50, 64), dielectric material 52 connecting the first and second conductors to each other, and an output or ground terminal section 54. The first electrical conductor has a first terminal section 48 and a first plate section 62. The second electrical conductor includes a second terminal section 50 and a second plate section 64. The second terminal section is connected to a first end of the second plate section. The second plate section includes a coil shaped section. The output terminal section is connected to an opposite second end of the second plate section. The dielectric material connects the first and second plate sections to each other.

In accordance with another aspect of the invention, an apparatus is provided comprising a capacitor and an output terminal 54. The capacitor comprises a first coil shaped plate 62 connected to a first terminal 48, a second coil shaped plate 64 connected to a second terminal 50, and dielectric material 52 connecting the first and second plates to each other in a spaced inter-rolled fashion. The output terminal is connected to the second plate at a location spaced from the second terminal. The second terminal, the second plate and the output terminal form an inductor such that the second coil shaped plate is a common member of both the capacitor and the inductor.

In accordance with another aspect of the invention, an apparatus is provided comprising a capacitor comprising a first terminal 48 and a winding roll plate 62 connected to the first terminal; and an inductor comprising an input 48, an output 54 and the winding roll plate 62. The input comprises the first terminal of the capacitor, and the output comprises an output terminal extending from the winding roll plate proximate an opposite end of the plate relative to the first terminal.

Figure 12:
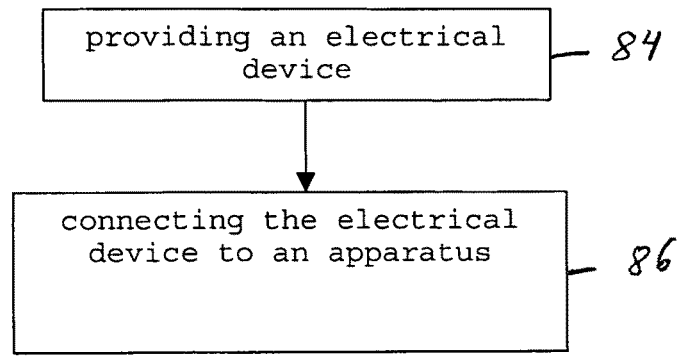
FIG. 12 is a flow chart of steps of one method of the invention.

Referring also to FIG. 12, in accordance with another aspect of the invention, a method is provided comprising providing an electrical device as indicated by block 84; and connecting an apparatus to the electrical device as indicated by block 86. The apparatus comprises a capacitor and an inductor having a common member forming a winding roll plate of the capacitor and a coil of the inductor. The common member is configured to provide inductance to reduce noise of the electrical device.

Figure 13:
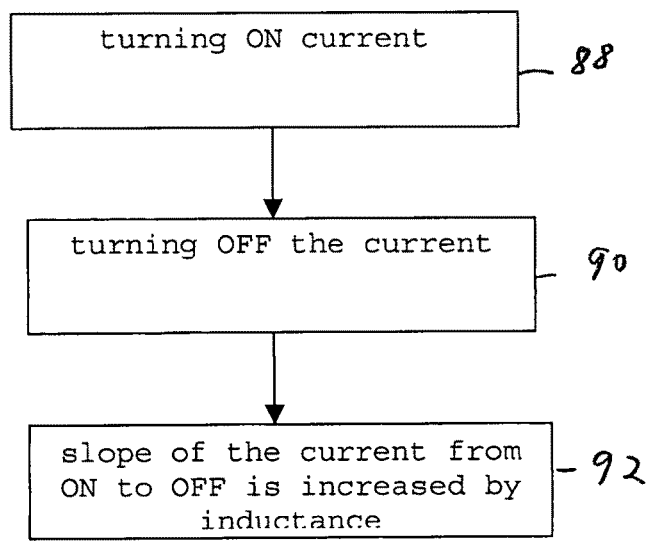
FIG. 13 is a flow chart of steps of another method of the invention.

Referring also to FIG. 13, in accordance with another aspect of the invention, a method is provided comprising turning ON current to an apparatus from a combined capacitor and inductor device as indicated by block 88, wherein a capacitor and an inductor of the device comprise a common member forming a winding roll plate of the capacitor and a coil of the inductor; and turning OFF the current from the capacitor to the apparatus as indicated by block 90, wherein a slope of the current from ON to OFF is increased as indicated by block 92 by inductance from the combined capacitor and inductor device to delay a current turn off point of the current from the capacitor.

The invention can be used to provide a ground when the capacitor is manufactured. Thus, there is no need for the xenon flash supplier to perform an extra manufacturing process to provide a grounding connection for a capacitor. The capacitor is automatically grounded when the terminal 54 is connected to ground.

With the invention, the invention can be provided by a camera module manufacturer or a flash module manufacturer to a device manufacturer, such as a manufacturer of a mobile telephone handset for example. The invention could be used in suitable multifunction devices having a camera function with a flash. The invention can also be used in a stand alone digital camera rather than a multifunction device. The invention can also be used in a device other than for a camera function. The invention could be provided as a flash module configured to be inserted into a device as a single subassembly, such as shown in FIG. 3 for example.

Figure 14:
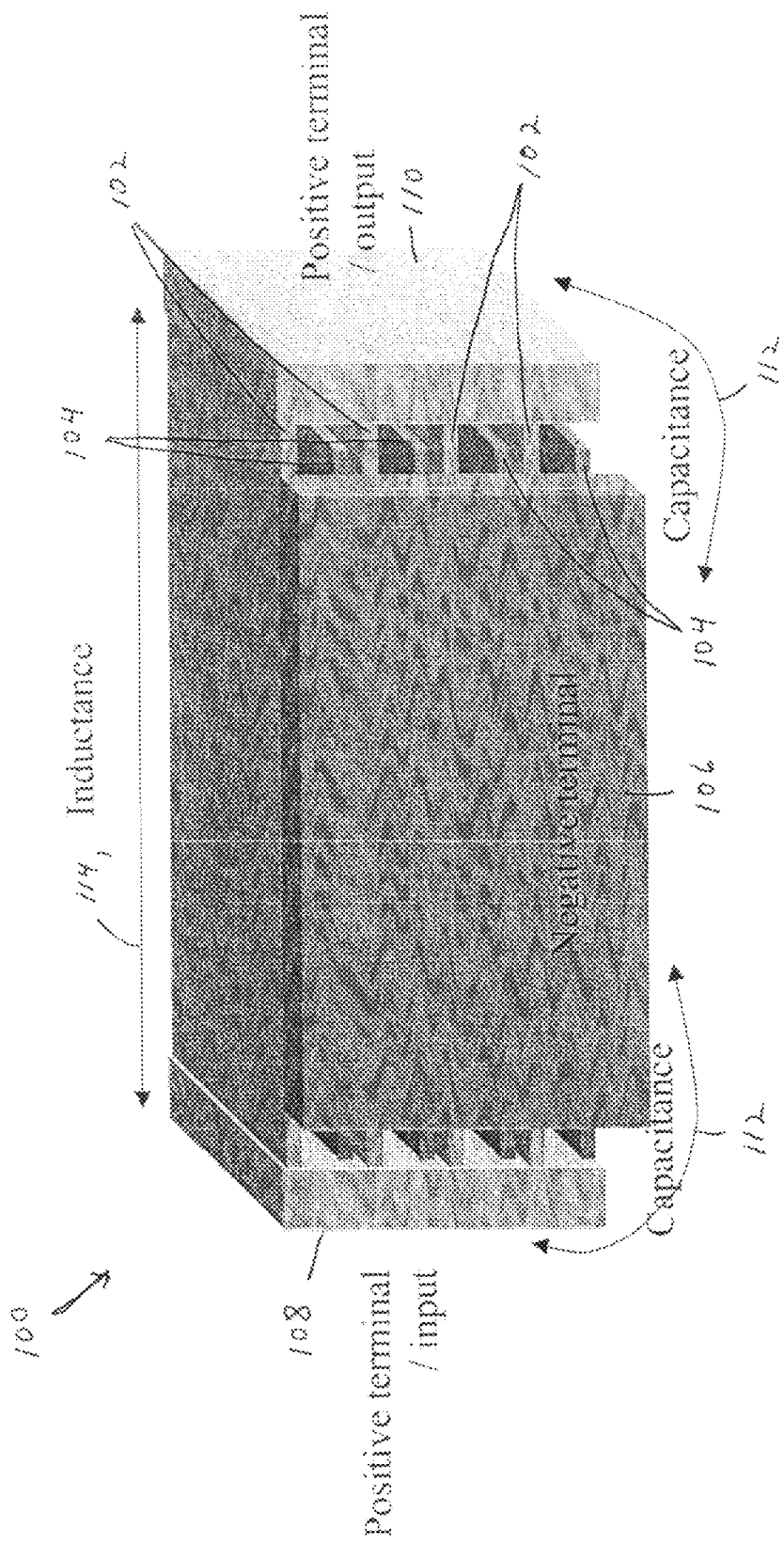
FIG. 14 is a perspective view of components of another alternate embodiment of the invention.
Figure 1:
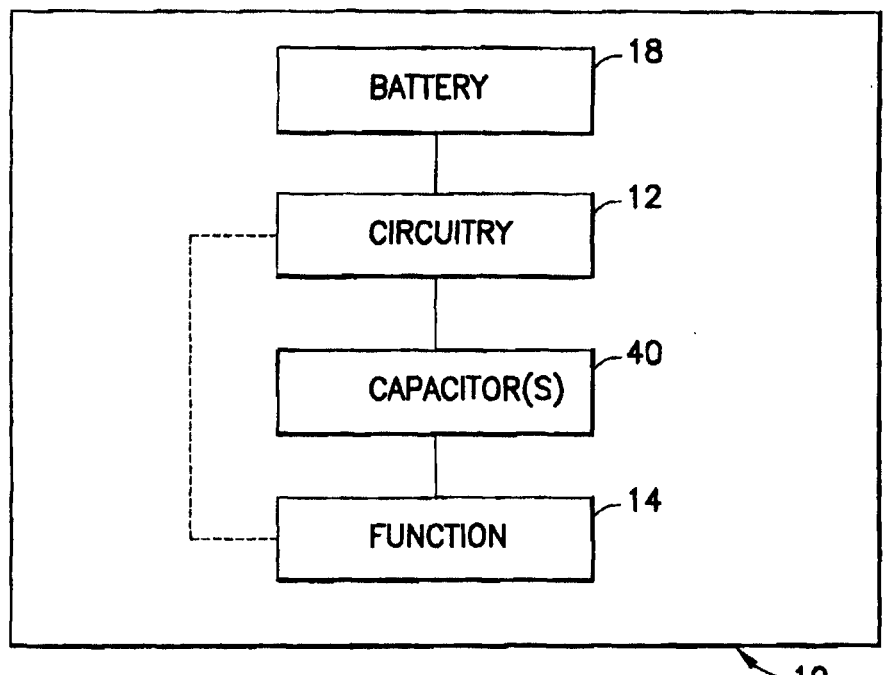
Figure 2:
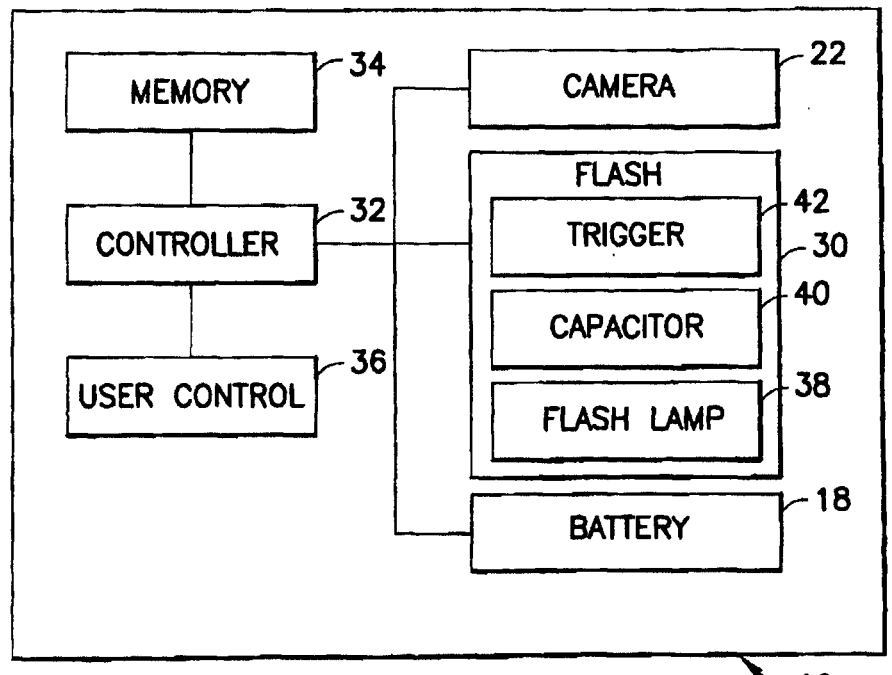
Figure 3:
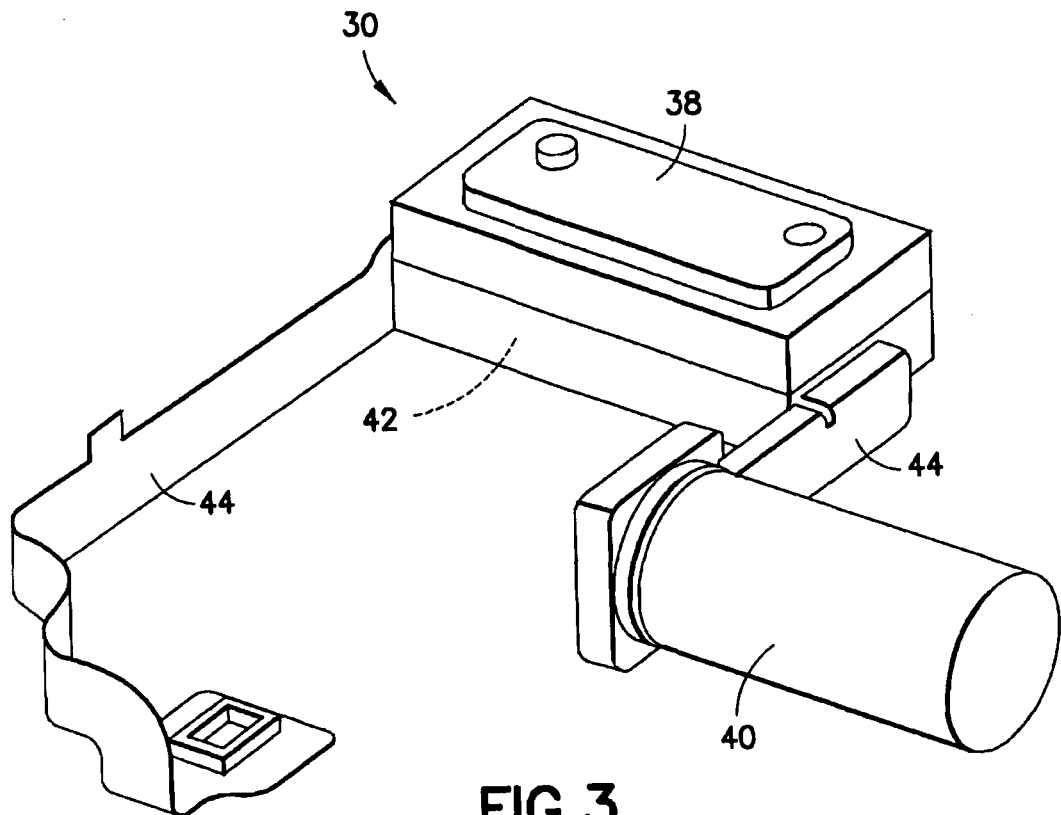
Figure 4:
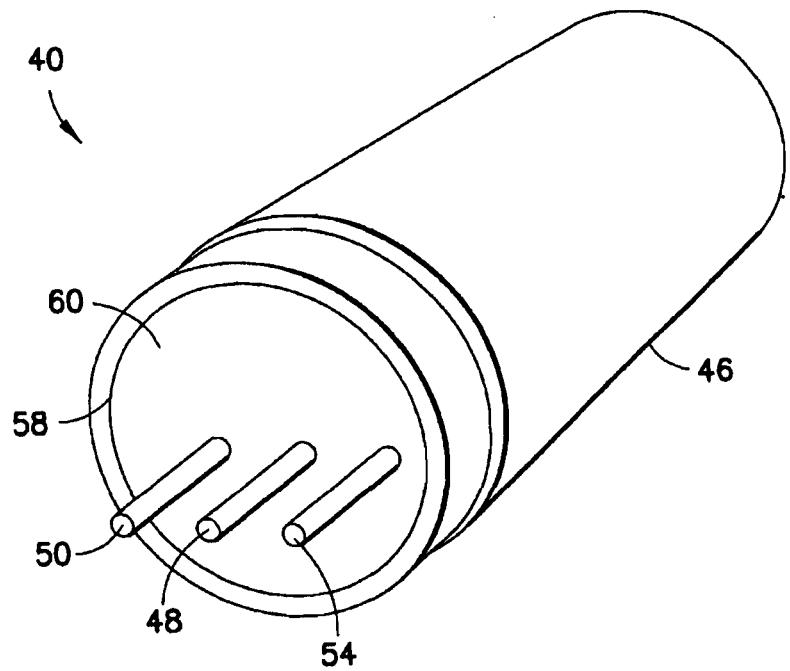
Figure 5:
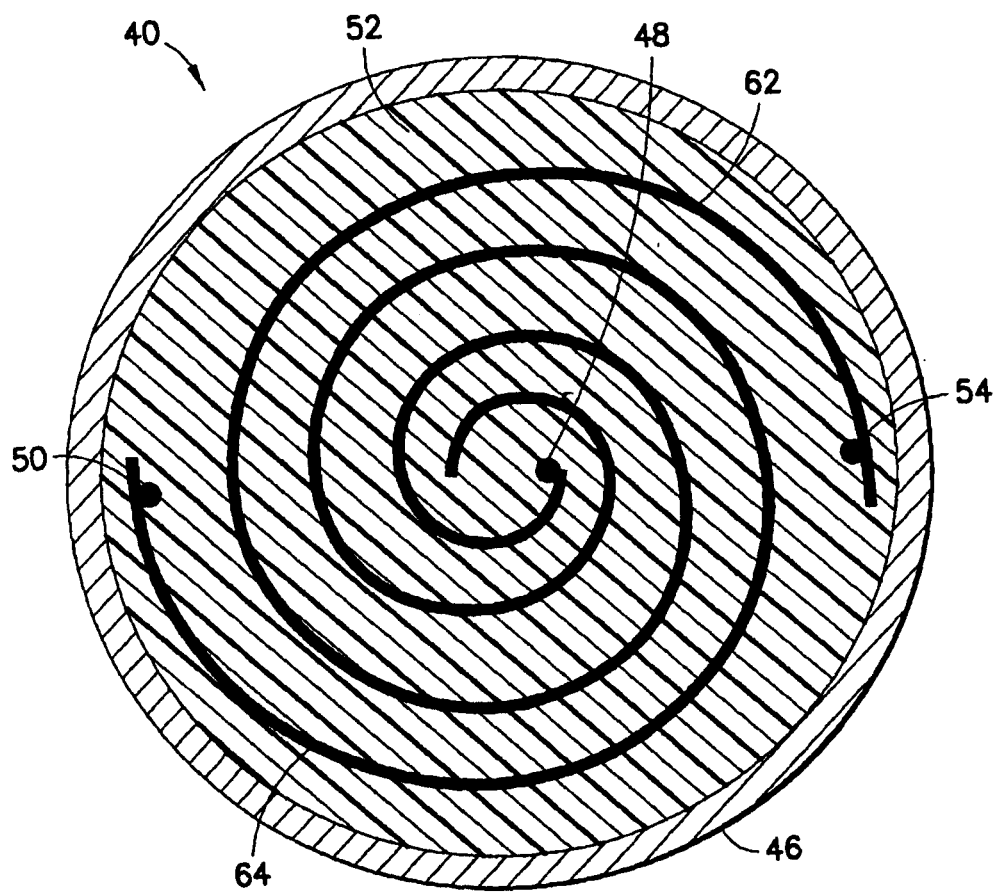
Figure 7:
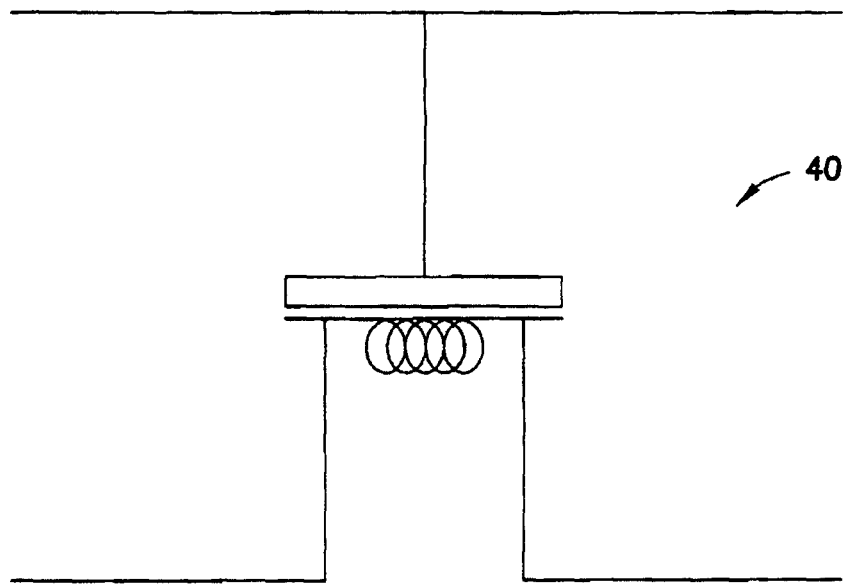
Figure 8:
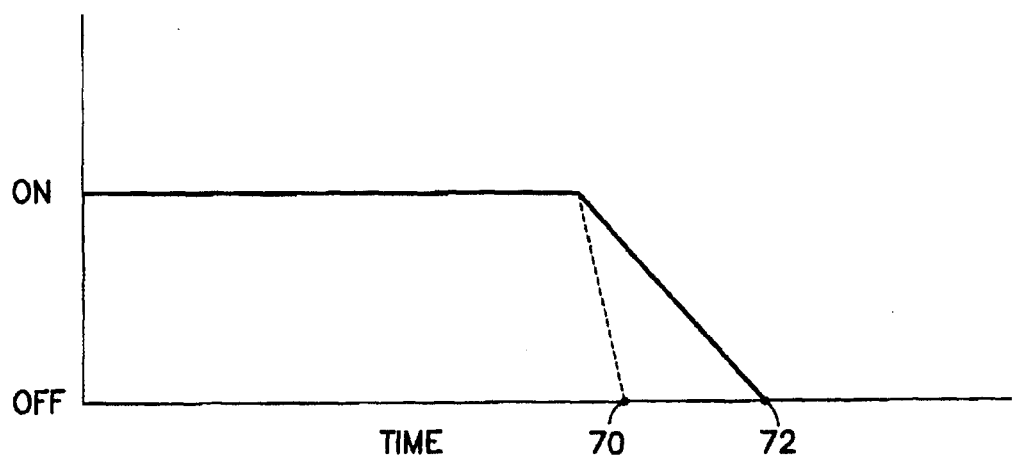
Figure 9:
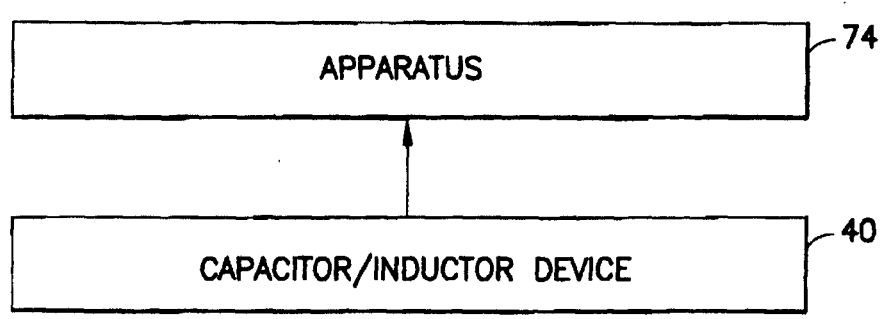
Figure 12:
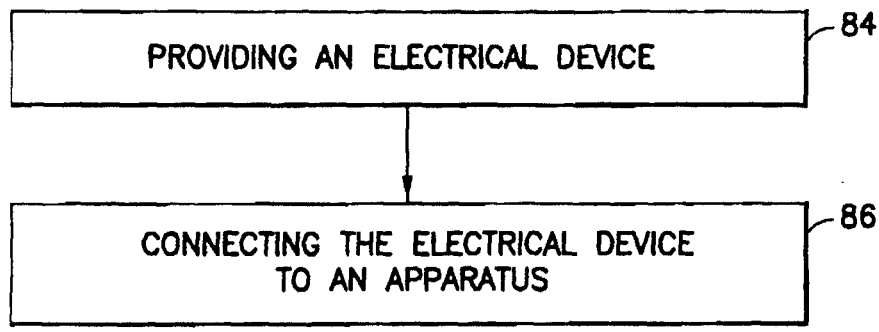
Figure 13:
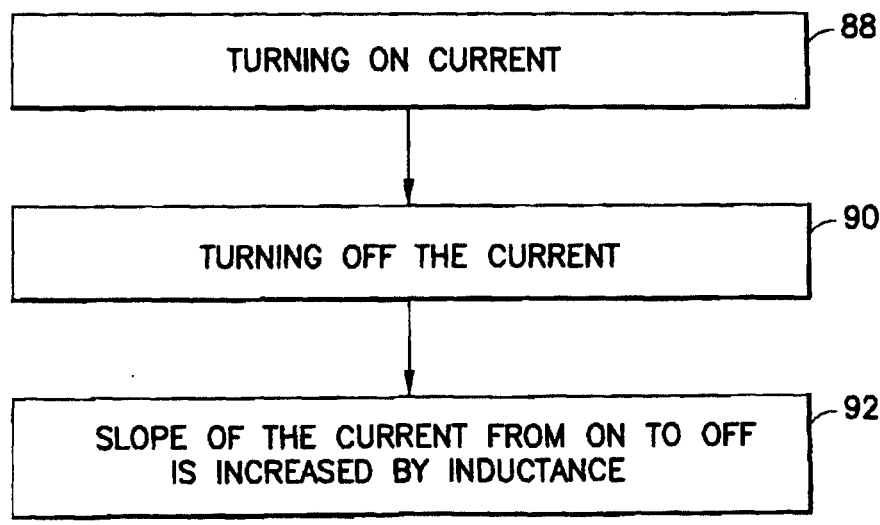
Figure 10:
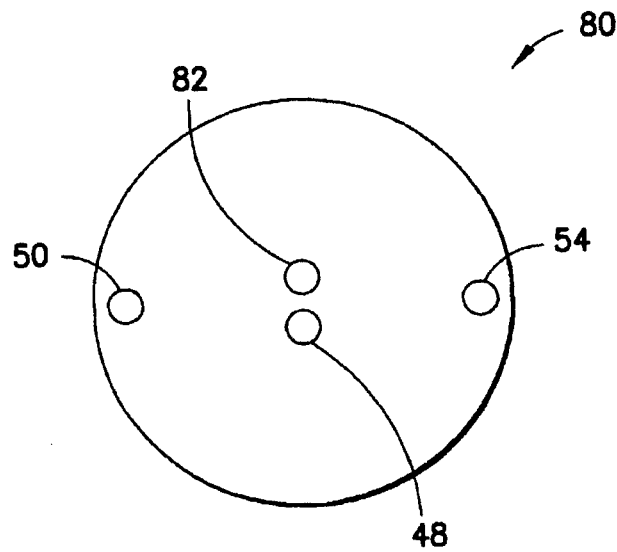
Figure 11:
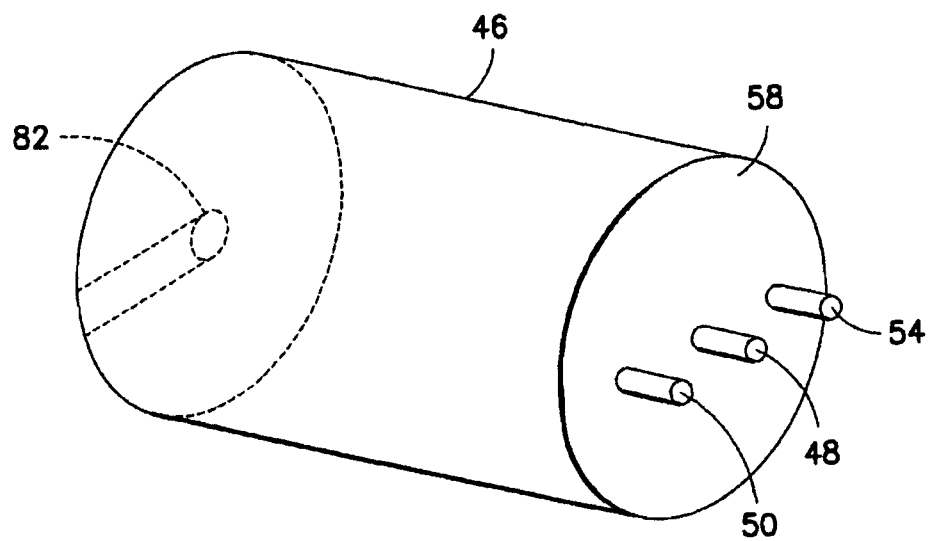
Figure 14:
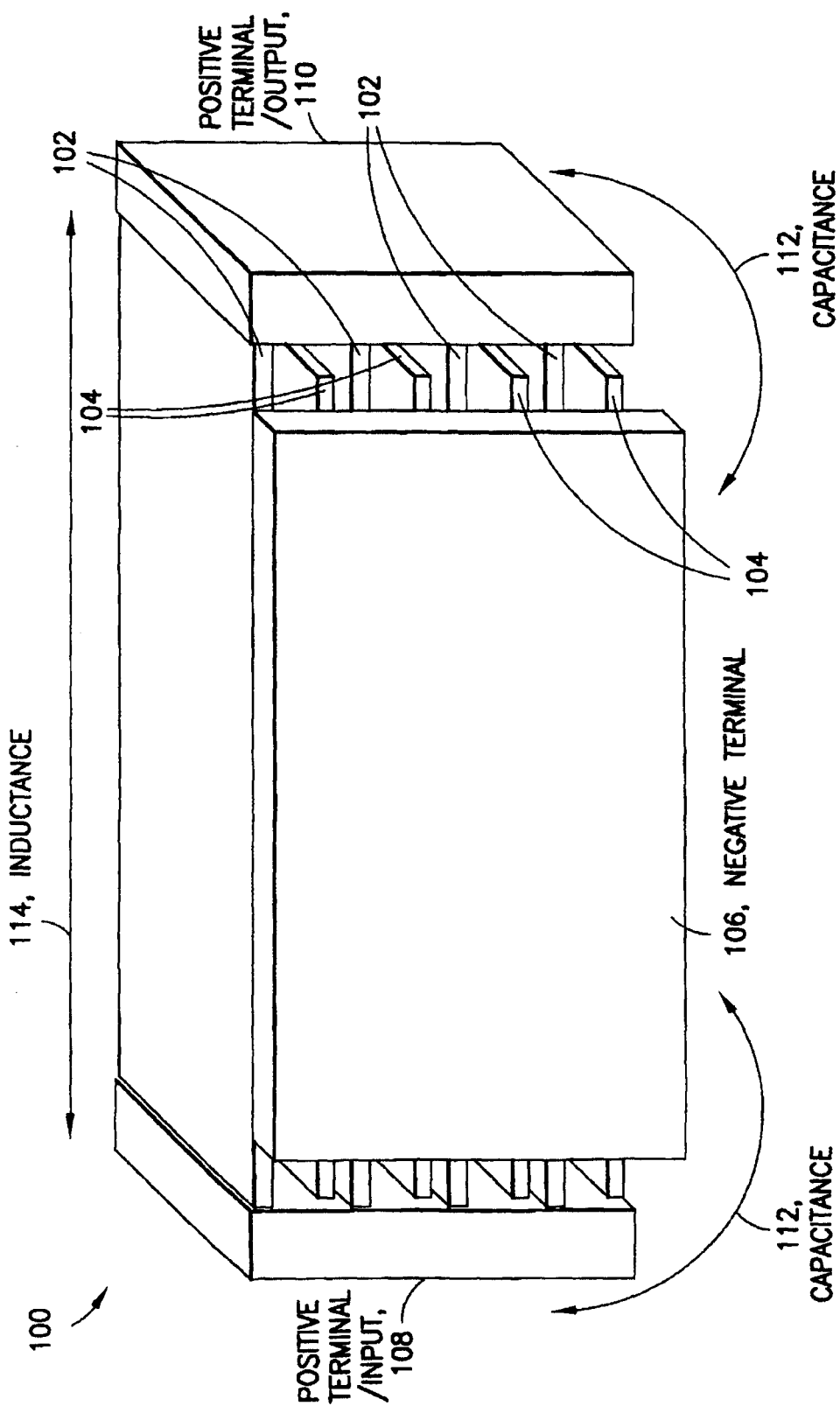

As noted above, the invention could be used in a ceramic capacitor. An example of this is shown in FIG. 14. The device 100 comprises positive capacitor plates 102 and negative capacitor plates 104 with ceramic material (not shown) therebetween. The ceramic material functions as the dielectric material among the plates 102/104. In this embodiment the plates 102, 104 are substantially flat and straight. Thus, the plates do not need to have a roll or coil shape. A negative terminal 106 is connected to a first end of the negative plates 104. A positive/input terminal 108 is connected to a first end of the positive plates 102, and a positive/output terminal 110 is connected to an opposite second end of the plates 102.

As illustrated by arrows 112, capacitance can be provided between the negative terminal 106 and the positive terminals 108, 110. Inductance can be provided between the positive/input terminal 108 and the positive/output terminal 110 as indicated by arrow 114. Thus, the invention can be used in a capacitor other than a coiled plate electrolytic capacitor design, and other than a coiled conductor inductor design.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined. Accordingly, the invention is intended to embrace all such alternatives, modifications and variances which fall within the scope of the appended claims.

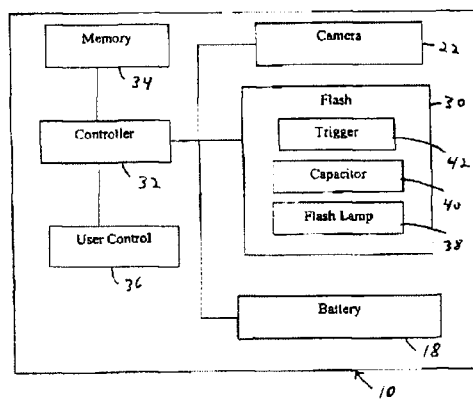

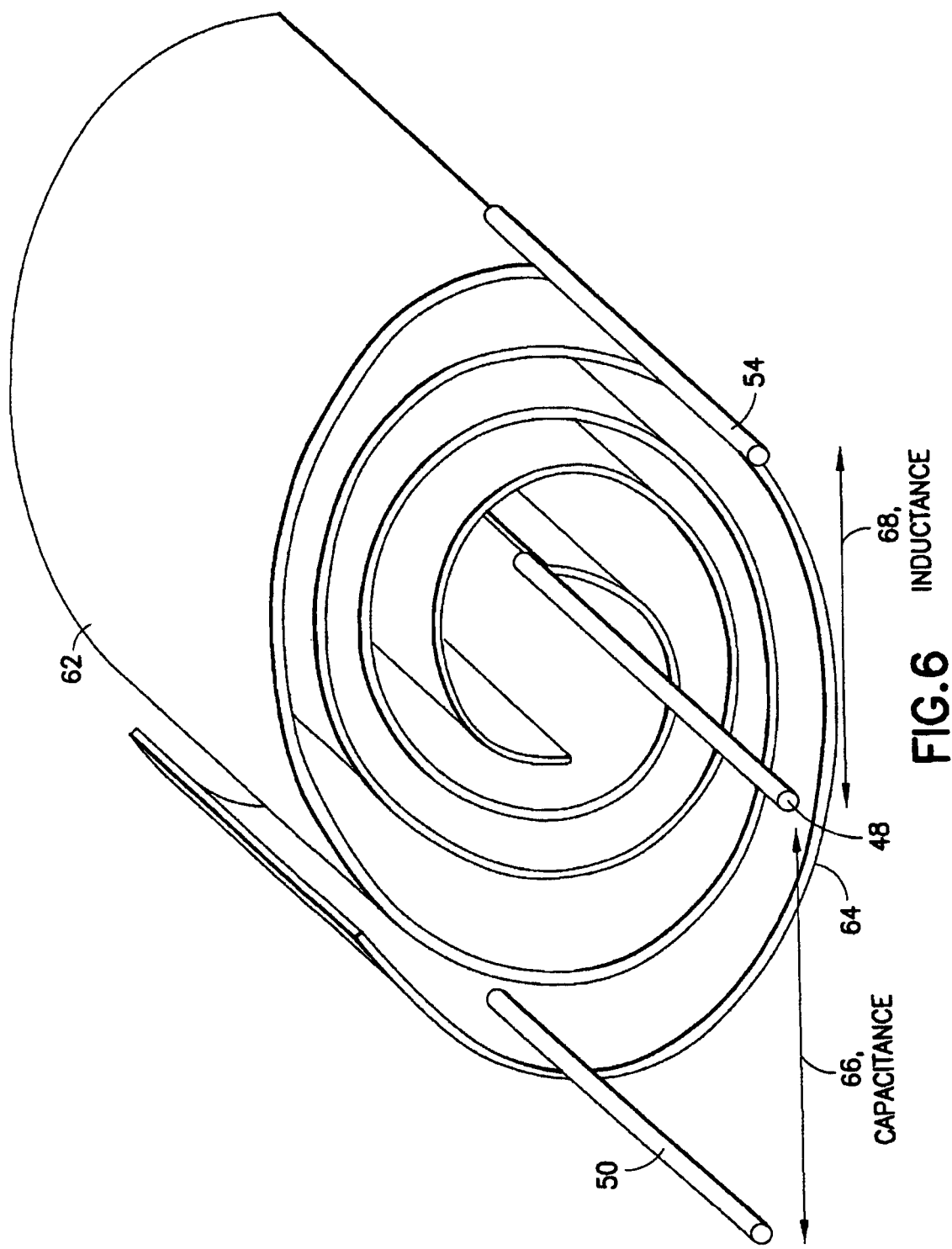

What is claimed is:

1. An apparatus comprising:
an electrical component having a plurality of electrical conductors; and
a flash connected to the plurality of electrical conductors, wherein the flash comprises a flash lamp and
an electrical device for a hand held device, the electrical device comprising:
a first electrical conductor comprising a first terminal;
a second electrical conductor comprising a second terminal;
the first electrical conductor further comprising a third terminal located at an opposite end of the first electrical conductor from the first terminal;
wherein the first and second electrical conductors are coreless;
wherein the first electrical conductor provides an inductance between the first terminal and the third terminal; and
wherein the first electrical conductor and the second electrical conductor provides a capacitance between the first electrical conductor and the second electrical conductor.

2. The apparatus of claim 1 wherein the first and second electrical conductors each comprise a winding roll shaped plate which forms the capacitance and forms the inductance.

3. The apparatus of claim 1 wherein the first and second electrical conductors comprise a ceramic capacitor.

4. The apparatus of claim 1 wherein the electrical component comprises a flex cable, and wherein the apparatus forms a flash subassembly configured to be assembled into another apparatus.

5. The apparatus of claim 1 wherein the apparatus comprises a camera connected to the electrical component.

6. The apparatus of claim 1 wherein the apparatus comprises a mobile telephone handset.

7. An apparatus comprising:
a switch mode power supply; and
an electrical device for a hand held device connected to an input or an output of the switch mode power supply, wherein the electrical device comprises:
a first winding roll plate; and
a second winding roll plate wound with the first winding roll plate, wherein a capacitance is formed between the first and second winding roll plates and an inductance is formed between at least a portion of the first winding roll plate, and the first and second winding roll plates are coreless.

8. The apparatus of claim 7 wherein the electrical device comprises at least three terminals, and wherein at least two of the terminals are connected to opposite ends of the first winding roll plate.

9. A device comprising:
a first electrical conductor comprising a first terminal and a first plate;
a second electrical conductor comprising a second terminal and a second plate, wherein the second terminal is connected to a first end of the second plate, wherein the second plate comprises a coil shape, wherein the first and second electrical conductors are coreless;
a third terminal connected to an opposite second end of the second plate;
dielectric material connecting the first and second plates to each other;
wherein the three terminals are all located on a same side of the device and an inductance formed at least between the second terminal and the third terminal, and
wherein the device is a component of a hand held device.

10. A device comprising:
a housing comprising electrically conductive material;
a first electrical conductor comprising a first terminal and a first plate;
a second electrical conductor comprising a second terminal and a second plate, wherein the second terminal is connected to a first end of the second plate section, and wherein the second plate comprises a coil shape shaped, and the first and second electrical conductors are coreless;
a third terminal connected to an opposite second end of the second plate, the second plate providing an inductance at least between the second terminal and the third terminal;
a dielectric material connecting the first and second plates to each other;
a fourth terminal connected to the first plate proximate an opposite end from the first terminal, wherein the fourth terminal is connected to the housing; and
wherein the device is a component of a hand held device.

11. The device of claim 9 wherein the first plate comprises a coil shape inter-rolled with the second plate, and wherein the dielectric material is disposed between the first plate and the second plate.

12. The device of claim 9 wherein the device forms a capacitor comprising the first conductor, the second conductor and the dielectric material, and wherein the device forms an inductor comprising the second conductor and the third terminal such that the second plate section forms a common member of the capacitor and the inductor.

13. A device comprising:
a housing comprising electrically conductive material;
a capacitor for a hand held device comprising a first coil shaped plate connected to a first terminal, a second coil shaped plate connected to a second terminal, and dielectric material connecting the first and second plates to each other in a spaced inter-rolled fashion, wherein the first and second coil shaped plates are coreless;
an output terminal connected to the second plate at a location spaced from the second terminal;
a fourth terminal connected to the first plate proximate an opposite end from the first terminal and connected to the housing; and
wherein the second terminal, the second plate and the output terminal provide an inductance between the second terminal and the output terminal, and wherein the second coil shaped plate is a common member of both the capacitor and the inductor.

14. The device as in claim 13 wherein the first, second and output terminals are located on a same side of the device with the first terminal between the second and output terminals.

15. A device comprising:
a housing comprising electrically conductive material;
a capacitor for a hand held device, the capacitor comprising:
a first terminal and a first winding roll plate connected to the first terminal;
a second terminal connected to the first winding roll plate; and
a grounding terminal connected to a second winding roll plate at an end opposite the second terminal and connected to the housing, wherein the first and second winding role plates are coreless; and
an inductor comprising an input, an output and the first winding roll plate, the input comprising the first terminal of the capacitor, and the output comprising an output terminal extending from the winding roll plate proximate an opposite end of the plate relative to the first terminal, the inductor providing inductance between the input and the output.

16. An apparatus, comprising:
a first positive terminal;
a second positive terminal;
a negative terminal disposed proximate to each of the first and second positive terminals;
one or more positive capacitor plates disposed between the first and second positive terminals, each of the one or more positive capacitor plates connected to the first and second positive terminals;
one or more negative capacitor plates disposed between the first and second positive terminals, each of the one or more negative capacitor plates connected to the negative terminal;
wherein the first positive terminal, second positive terminal and negative terminal are perpendicular to the one or more positive capacitor plates and negative capacitor plates; and
wherein a capacitance is provided between the negative terminal and the first positive terminal and a capacitance is provided between the negative terminal and the second positive terminal, and an inductance is provided between the first and second positive terminals.

17. The apparatus of claim 16, wherein the one or more positive capacitor plates comprise one or more flat positive capacitor plates, the one or more negative capacitor plates comprise one or more flat negative capacitor plates, and wherein the one or more flat positive capacitor plates are alternately disposed with the one or more flat negative capacitor plates.

18. The apparatus of claim 16, wherein a ceramic dielectric is disposed between the one or more positive capacitor plates and the one or more negative capacitor plates.

* * * * *

UNITED STATES PATENT AND TRADEMARK OFFICE
CERTIFICATE OF CORRECTION

| | | |
|---|---|---|
| PATENT NO. | : 8,908,350 B2 | Page 1 of 10 |
| APPLICATION NO. | : 12/215261 | |
| DATED | : December 9, 2014 | |
| INVENTOR(S) | : Matti Naskali et al. | |

It is certified that error appears in the above-identified patent and that said Letters Patent is hereby corrected as shown below:

Delete Title Page with Illustrative Figure, and replace with new Title Page with Illustrative Figure (Attached)

In the Drawings

Figures 1-14    Replace "Figures 1-14" with
-- Replacement Figures 1-14 -- (Attached)

Signed and Sealed this
Twenty-eighth Day of July, 2015

Michelle K. Lee
*Director of the United States Patent and Trademark Office*

(12) United States Patent
Naskali et al.

(10) Patent No.: US 8,908,350 B2
(45) Date of Patent: Dec. 9, 2014

(54) CAPACITOR

(75) Inventors: Matti Naskali, Tokyo (JP); Samuli Wallius, Turku (FI); Lassi Yla-Soininmaki, Turku (FI)

(73) Assignee: Core Wireless Licensing S.A.R.L., Luxembourg (LU)

(*) Notice: Subject to any disclaimer, the term of this patent is extended or adjusted under 35 U.S.C. 154(b) by 1162 days.

(21) Appl. No.: 12/215,261

(22) Filed: Jun. 25, 2008

(65) Prior Publication Data
US 2009/0323251 A1 Dec. 31, 2009

(51) Int. Cl.
*H01G 4/232* (2006.01)
*H01G 4/40* (2006.01)
*H01F 17/02* (2006.01)

(52) U.S. Cl.
CPC .............. *H01G 4/232* (2013.01); *H01G 4/40* (2013.01); *H01F 17/02* (2013.01)
USPC .......... 361/270; 361/271; 361/272; 361/275.1

(58) Field of Classification Search
USPC ............... 361/270, 271, 272, 275.1
See application file for complete search history.

(56) References Cited

U.S. PATENT DOCUMENTS

| | | | |
|---|---|---|---|
| 1,460,390 A | 7/1923 | O'Leary | |
| 2,521,513 A | 9/1950 | Gray | 315/243 |
| 2,840,694 A * | 6/1958 | Morgan | 455/95 |
| 3,025,431 A * | 3/1962 | Reimers | 315/241 P |
| 3,671,885 A * | 6/1972 | Pennypacker | 333/131 |
| 3,691,435 A * | 9/1972 | Winn | 361/330 |
| 3,775,720 A * | 11/1973 | Winn | 336/69 |
| 3,782,258 A * | 1/1974 | Boekkooi et al. | 396/182 |
| 3,870,392 A * | 3/1975 | Bond | 439/92 |
| 4,320,364 A | 3/1982 | Sakamoto et al. | 333/167 |
| 4,368,407 A * | 1/1983 | Wroblewski | 315/291 |
| 5,040,094 A | 8/1991 | Okumura | 361/330 |
| 5,103,147 A * | 4/1992 | Samann | 318/139 |
| 5,153,812 A | 10/1992 | Naito | 361/270 |
| 5,337,028 A | 8/1994 | White | 333/181 |
| 5,367,275 A | 11/1994 | Esaki et al. | 333/184 |
| 5,515,126 A * | 5/1996 | Baxter et al. | 396/177 |
| 5,522,851 A * | 6/1996 | Fayram | 607/5 |
| 5,892,668 A * | 4/1999 | Okamoto et al. | 363/40 |
| 5,920,292 A * | 7/1999 | O'Neill, Jr. | 343/895 |
| 6,204,817 B1 * | 3/2001 | Edvardsson | 343/702 |
| 6,255,935 B1 * | 7/2001 | Lehmann et al. | 307/3 |
| 6,529,363 B2 * | 3/2003 | Waffenschmidt et al. | 361/270 |
| 6,661,644 B2 * | 12/2003 | Shimada et al. | 361/508 |
| 6,836,401 B2 * | 12/2004 | Yoshida et al. | 361/538 |
| 7,385,804 B2 * | 6/2008 | Kuriyama | 361/532 |
| 2007/0086146 A1 * | 4/2007 | Timmerman et al. | 361/434 |

FOREIGN PATENT DOCUMENTS

GB 1315878 A 5/1973

OTHER PUBLICATIONS

Perkinelmer Optoelectronics, High Performance Flash and Arc Lamps. Brochure (online). Created on Oct. 9, 2009, modified Sep. 25, 2006.

* cited by examiner

*Primary Examiner* — Zeev V Kitov
(74) *Attorney, Agent, or Firm* — Winstead PC

(57) ABSTRACT

A device including a first electrical conductor, a second electrical conductor, dielectric material connecting the first and second conductors to each other, and an output or ground terminal section. The first electrical conductor has a first terminal section and a first plate section. The second electrical conductor includes a second terminal section and a second plate section. The second terminal section is connected to a first end of the second plate section. The second plate section includes a coil shaped section. The output terminal section is connected to an opposite second end of the second plate section. The dielectric material connects the first and second plate sections to each other.

18 Claims, 8 Drawing Sheets